April 7, 1953     J. W. BARNES     2,634,309
EXTENSION CORD SET
Filed Nov. 18, 1948
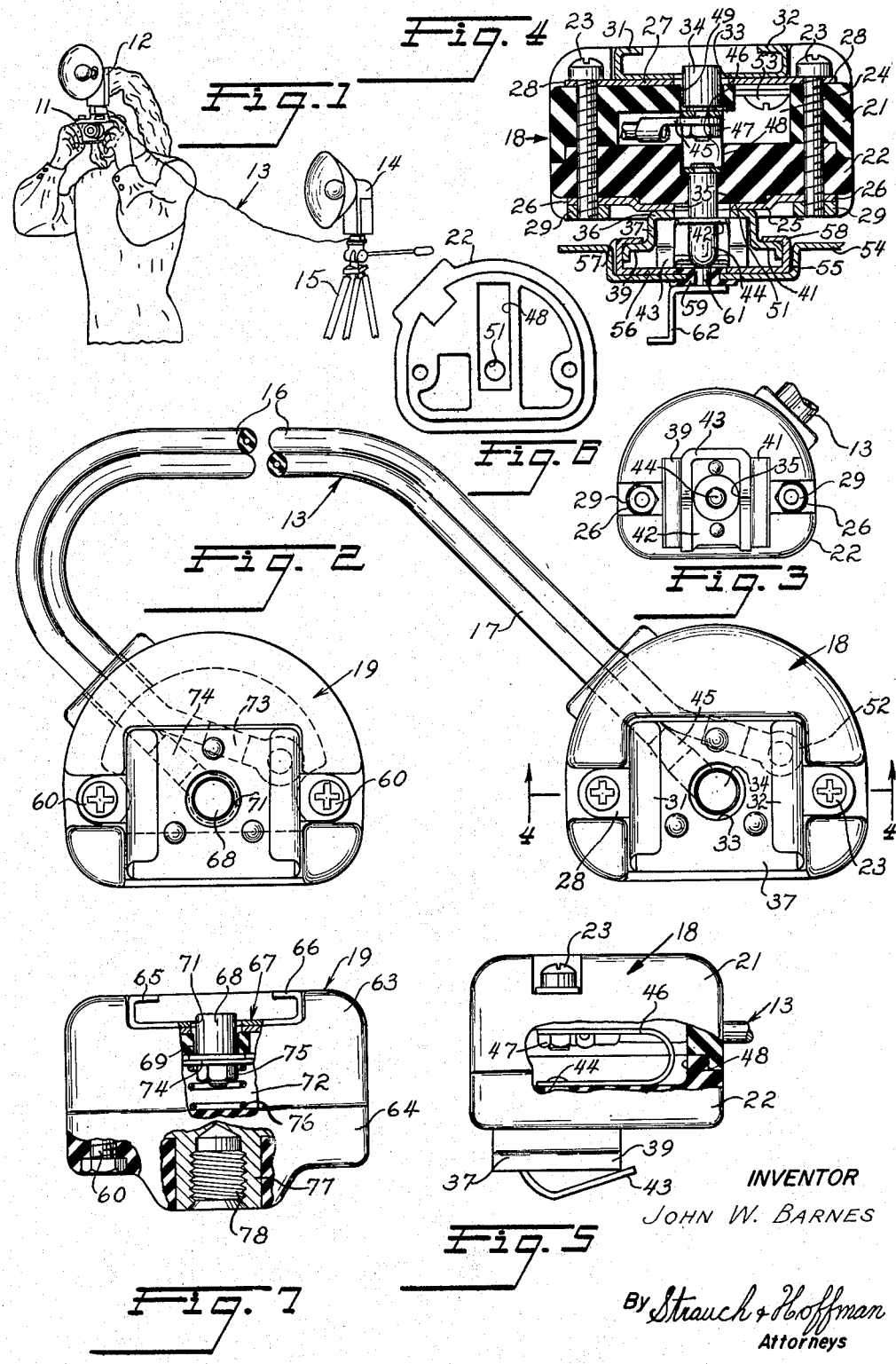
INVENTOR
JOHN W. BARNES
By Strauch & Hoffman
Attorneys Patented Apr. 7, 1953

2,634,309

UNITED STATES PATENT OFFICE 2,634,309

EXTENSION CORD SET

John W. Barnes, Ann Arbor, Mich., assignor to Argus Cameras, Inc., a corporation of Michigan Application November 18, 1948, Serial No. 60,740

1 Claim. (Cl. 173—324)

This invention relates to a special extension cord set for photographic purposes to enable multiple flash guns to be synchronized with a camera.

The invention is proposed to satisfy a demand from photographers for better and more artistic lighting of subjects to be photographed. It enables several flash lamps to be fired with actuation of the camera shutter to illuminate the subject from desired angles and eliminate the flat lighting effects often encountered where only a single flash gun is fired.

It is the primary object of my invention to provide a novel extension cord structure adapting several flash lamp units to a camera having a shutter controlled switch. The units may be mounted in various combinations, and a particular further object of the invention is to provide novel camera socket and tripod attachment devices in the flash extension.

A further object of the invention is to provide a socket device for mounting a flash gun or the like and embodying novel internal construction wherein a resiliently biased central contact is mounted.

Further objects of the invention will appear as the description proceeds in connection with the appended claim and the annexed drawings wherein:

Figure 1 is a diagrammatic view illustrating one usage of the extension of the invention;

Figure 2 is an enlarged top plan view of the extension cord assembly;

Figure 3 is a bottom plan view of the plug at the input end of the extension;

Figure 4 is a section through the center of one plug of Figure 2 illustrating it in the associated camera socket;

Figure 5 is an end elevation, partly broken away and in section, of the plug of Figures 3 and 4;

Figure 6 is a plan view of the inside of one of the blocks of the plug; and

Figure 7 is a front elevation, partly broken away and in section of the plug at the tripod end of the extension.

Referring to Figure 1, the invention is shown for adapting a camera for use with flash gun mounted respectively on the camera and on a tripod, the flash gun on the camera being directed squarely at the subject to be photographed and the tripod disposed at a suitable angle to provide such illumination as may be considered desirable for the picture. Figure 1 illustrates the operator holding the camera at eye level while peering through the finder and a flash gun 12 mounted in a socket at the top of the camera and connected by an extension cord indicated at 13 to a similar flash gun 14 mounted on the tripod 15.

Preferably each of the flash guns 12 and 14 is of the construction illustrated in the co-pending application of Hobert W. French, Jr., Serial No. 710,015, filed November 15, 1946, now Patent No. 2,565,492, and the camera is preferably one having a cooperating upper socket as illustrated in the co-pending application of James E. Harvey, Serial No. 21,284, filed April 15, 1948, to which reference is made for further disclosure of the socket on the camera and the flash gun holder if necessary for understanding of this invention.

The extension cord comprises insulated wires 16 and 17 connected at opposite ends to terminals in a camera attachment plug 18 and a tripod attachment plug 19 as illustrated best in Figure 2. The camera attachment plug 18 (Figure 4) comprises upper and lower blocks 21 and 22 of hard plastic material, the upper block 21 having a depending outer rim by which it is piloted and seated on the lower block for aligning the holes through which bolts 23 extend to secure the blocks together.

Interiorly, upper block 21 is recessed to provide within the assembly a chamber 24 for connection of the contacts and for resiliently mounting the center terminal of the plug as will appear. Referring to Figures 3 and 4, the bottom of lower block 22 comprises a recessed portion in which is seated a metal plate 25 having oppositely projecting ears 26. The top of block 21 is similarly recessed to seat a larger metal plate 27 having oppositely projecting ears 28. Bolts 23 extend through blocks 21 and 22 and when nuts 29 are tightened the entire plug assembly is drawn together with bolts 23 electrically connecting the outer socket members.

At opposite sides plate 27 is bent upwardly and then inwardly to provide slide guides 31 and 32. Plate 27 is centrally apertured at 33 and a central metal terminal post 34 projects through aperture 33 slightly above the surface of the plate and with sufficient clearance with aperture 33 to prevent short circuit.

Plate 25 is centrally apertured at 35 and rigidly secured to it, as by rivets, is a metal plate 36 apertured in alignment with aperture 35 and having its opposite sides bent downwardly at legs 37. Legs 37 terminate in slide guide feet 39 and 41 comprising integral outward and downward extensions of the legs. Guide feet 39 and 41 are parallel to guides 31 and 33.

An apertured metal plate 42, riveted to plates 25 and 36, has an integral U-shaped spring leg 43 that extends parallel to the guide feet and between them for a purpose to appear. A bottom metal terminal post 44 projects through aperture 35 and plates 36 and 42 in spaced relation so as to be insulated therefrom.

Within chamber 24, the inner end of post 34 is shouldered and threaded for removably securing thereon a wire terminal clip 45 and one end of a U-shaped metal spring blade 46, as by a nut 47. The other end of a spring 46 is riveted to the inner end of post 44 and is disposed in a narrow recess 48 in block 22 whereby rotation of spring 46 about the axes of the posts is prevented.

Post 34 projects with a fairly close slide fit through an opening 49 in block 21, and post 44 projects with a fairly close slide fit through an opening 51 in block 22, so that the spring connected posts 34 and 44 are guided for axial movement in the plug.

Wire 17 is connected to clip 45, and wire 16 is connected to a terminal clip 52 that is removably secured as by screw 53 to plate 27 within chamber 24, the wires entering the plug through a suitable side aperture.

When the plug is assembled, with bolts 23 drawn tight, spring 46 is compressed into its U-shaped energized position shown in Figure 5 since its opposite legs bear respectively on the blocks 21 and 22. It will be appreciated however that both posts 34 and 44 may be displaced axially inwardly against further resilient resistance of spring 46 which tends to keep them at their outermost projected position. Posts 34 and 44 are preferably in axial alignment.

In Figure 4, the upper wall of the camera 11 is indicated at 54 and is formed with a depression 55. A metal plate 56 is riveted to the camera wall and the sides of plate 56 are bent upwardly and inwardly to form slide guides 57 and 58 that are exactly the same shape and size as guides 31 and 32. Plate 56 and the camera wall are apertured to receive an insulating button 59 carrying a center contact 61 that is in turn secured to a lead 62 from the shutter mechanism. Lead 62 provides one side of the line within the camera and the metal wall of the camera provides the other side of the line. Looking down on it the socket at the top of the camera is substantially identical with the socket at the top of plug 18 except that in the camera the center terminal is fixed.

Since the guides 57 and 58 provide an open ended socket structure, the plug 18 may be mounted on the camera by sliding the plug to the left with respect to Figure 5 with guide feet 39 and 41 within the slide guides 57 and 58. The spring 43 is cammed toward the plug during this action and this so energizes it as to exert an axial force that maintains the plug tight on the camera with contact 61 engaged with post 44, the latter moving inwardly of the plug a slight distance during this mounting of the plug so that spring 46 tends to resiliently urge post 44 and contact 61 together to secure the best possible electrical contact.

The socket structure at the bottom of flash gun 12 is the same as the guide foot and spring structure at the bottom of plug 18 above described, so that the flash gun 12 is mounted on the plug 18 in the same manner that plug 18 is mounted on the camera, post 34 being resiliently urged into engagement with the flash gun socket center contact by spring 46.

Figure 7 illustrates the plug 19 at the other end of the cord which comprises upper and lower blocks 63 and 64 of insulating plastic held together as in block 18 by through bolts 60. The upper socket of block 19, comprising slide guides 65 and 66 at opposite sides of terminal plate 67 are the same as slide guides 31 and 32 on block 21.

A center contact post 68 extends above the level of plate 67 through a sliding fit aperture 69 in block 63 and a much larger aperture 71 in plate 67 so as to be insulated from plate 67. Within the plug, block 63 is formed with a chamber 72 wherein wire terminal clips 73 and 74 are secured respectively to the plate 67 by a screw (not shown but like that at 63) and to the threaded shouldered inner end of post 68 as by nut and washer assembly 75. A coiled compression spring 76 reacting between the inner flat surface of block 64 and the washer on post 68 resiliently urges post 68 to its uppermost position but permits such axial displacement of the post as may be needed to accommodate the socket structure of the lower end of flash gun 14 which is the same as that at the bottom of plug 18.

The wires 16 and 17 project through a suitable side opening in plug 19 to connect with clips 73 and 74 respectively, the center contacts of the plugs being connected to each other and to the center contact 61 in the camera, and the slide guides all being connected together and providing the other side of the line.

The bottom of block 64 contains a molded insert sleeve of metal 77 threaded at 78 to fit with the standard screw that projects up from the conventional tripod. Obviously any other tripod attachment device may be used here.

I have thus described an extension wherein two flash guns may be used, mounted on the camera and a tripod respectively. It will be seen that flash gun 14 may be held in the hand as well as on a tripod, and if desired the plugs at opposite ends of cord 13 may be identical so that another similar cord may be attached for using more than two flash guns. The variations of the arrangement are obvious.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

An extension cord for a camera photoflash assembly comprising a pair of insulated electrical conductors having attachment plugs at opposite ends, substantially identical sockets on the tops of both of said plugs each comprising parallel slide guide elements facing toward each other and an insulated center contact, a socket on the bottom of one of said plugs comprising spaced depending parallel guide foot elements and an insulated center contact, said guide foot elements being proportioned to operatively fit only within a socket similar to one of said top sockets, means connecting one of said conductors to all of said center contacts, and means connecting the other of said conductors to the guide elements of all of said sockets.

JOHN W. BARNES.

REFERENCES CITED

The following references are of record in the file of this patent:

UNITED STATES PATENTS

| Number | Name | Date |
|---|---|---|
| 852,490 | Benjamin | May 7, 1907 |
| 1,241,106 | Frydrychowicz | Sept. 25, 1917 |
| 1,568,407 | Lee | Jan. 5, 1926 |
| 1,632,081 | Jones | June 14, 1927 |
| 1,741,264 | Wappler | Dec. 31, 1929 |
| 1,812,396 | Eckstein | June 30, 1931 |
| 1,888,714 | Erikson | Nov. 22, 1932 |
| 1,894,112 | McNeil | Jan. 10, 1933 |
| 2,177,409 | Hummert | Oct. 24, 1939 |
| 2,424,422 | Tresise | July 22, 1947 |